June 8, 1965 P. HÖLLER 3,188,180
PROCESS FOR THE EXTRACTION OF GASES FROM METALS
Filed May 8, 1962 3 Sheets-Sheet 1

INVENTOR:
PAUL HÖLLER
BY Karl F. Ross
AGENT

June 8, 1965  P. HÖLLER  3,188,180
PROCESS FOR THE EXTRACTION OF GASES FROM METALS
Filed May 8, 1962  3 Sheets-Sheet 2

INVENTOR:
PAUL HÖLLER
BY Karl F. Ross
AGENT

INVENTOR:
PAUL HÖLLER
BY Karl F. Ross
AGENT

3,188,180
PROCESS FOR THE EXTRACTION OF GASES
FROM METALS
Paul Höller, Essen-Frintrop, Germany, assignor to Firma Huttenwerk Oberhausen A.G., Oberhausen, Rhineland, Germany, a corporation of Germany
Filed May 8, 1962, Ser. No. 193,229
Claims priority, application Germany, May 9, 1961, H 42,539
6 Claims. (Cl. 23—230)

My present invention relates to a process for the extraction of gases from metals and, more particularly, to the extraction of gases with the aid of an electric arc from metal samples for the purpose of analyzing the gas content.

It is known to determine the gas content of steel and other metals and to analyse it for the relative concentration of gases such as oxygen, nitrogen and hydrogen. Current methods for such analyses make use of newly developed high-speed techniques wherein a sample of the metal is melted in an electric arc to produce temperatures of, for example, 3500° and drive out the gases contained within the sample. The extracted gases are analysed with the aid of spectrometers or the like. The melting of the metal samples and the extraction of the gases contained therewithin were, hitherto, carried out in extraction or activation chambers from which removal of trace amounts of impurity gases was difficult.

In general, such activation chambers were hermetically sealed units provided with a support for the metal samples, a pair of arc electrodes and a device for evacuating the chamber and blanketing the sample interposed between the electrodes with a protective gas. The extraction of gases from these samples and their subsequent analysis was highly sensitive to the presence of atmospheric oxygen so that considerable preparation went into removing all oxygen and other impurity gases from the chamber prior to extraction.

The preparation of the activation chamber was carried out by repeated evacuation and heating, e.g. by flaming out, prior to its use for gas extraction. Thus, previously existing methods for preparing such chambers and the chambers themselves were not conducive to high-rate analysis of metallic samples.

It is an object of the present invention, therefore, to provide a process for extracting gases from metals at a very high rate without a decline in the accuracy of the gas determinations.

A further object of the invention is to provide a method of operating an activation or extraction chamber of the aforementioned character adapted to obviate the disadvantages of hitherto existing methods.

The above and other objects of the instant invention, some of which will become more clear hereinafter, have been realized in a process for extracting gases from metal samples with the aid of an electric arc wherein the extraction chamber is, prior to the introduction of the metal samples or the disposition thereof in the region of the arc, filled with an inert or reducing protective gas. An electric arc is then struck between the electrodes to produce a high temperature, in excess of that to be employed subsequently for melting the samples, to release impurity gases within the chamber and to render the electrodes and/or sample holders free from such gases.

According to a more specific feature of the invention, the atmosphere within the chamber consists of an inert gas such as argon admixed with hydrogen, preferably in an amount between 1 and 10% by volume. Thus, the purging of the activation chamber is carried out in a reducing atmosphere with the aid of an electric arc of higher voltage and, consequently, higher electrode temperature than is possible with the use of the pure inert gas. Subsequently, the metal samples are introduced into the vessel and blanketed with the pure inert gas (e.g. argon free from substantial amounts of hydrogen of the type previously mentioned) and an electric arc is struck between the sample and the counterelectrode to melt the former and to extract the gases trapped therein.

Advantageously, the activation chamber is provided with a plurality of sample holders, carried by a common support, each of which can be successively displaced into the region of the counterelectrode and degassed in the aforementioned manner. After the metal samples have been placed on their holders and blanketed with the inert gas, the chamber is evacuated and additional inert gas added to raise it to the desired pressure for the gas extraction. The foregoing process permits the rapid cleansing of the chamber with an exceptionally high efficiency. The analysis of the extracted gas, which is carried off by the continuous stream of inert gas, may be effected with the aid of a conventional spectrometer whose sensing element can be directed at the electric arc. The carbon monoxide content of the gas may be determined by coulometric titration. As a consequence of the high arc temperatures employed, the oxygen is quantitatively converted into carbon monoxide and can be determined with ease via the coulometric titration. Advantageously, the polarity of the electrodes employed during the degasification step is alternately reversed, which results in a highly efficient removal of the gases absorbed by these electrodes.

The above and other objects of my invention will become more readily apparent from the following description, reference being made to the appended drawing in which.

Figure 1:
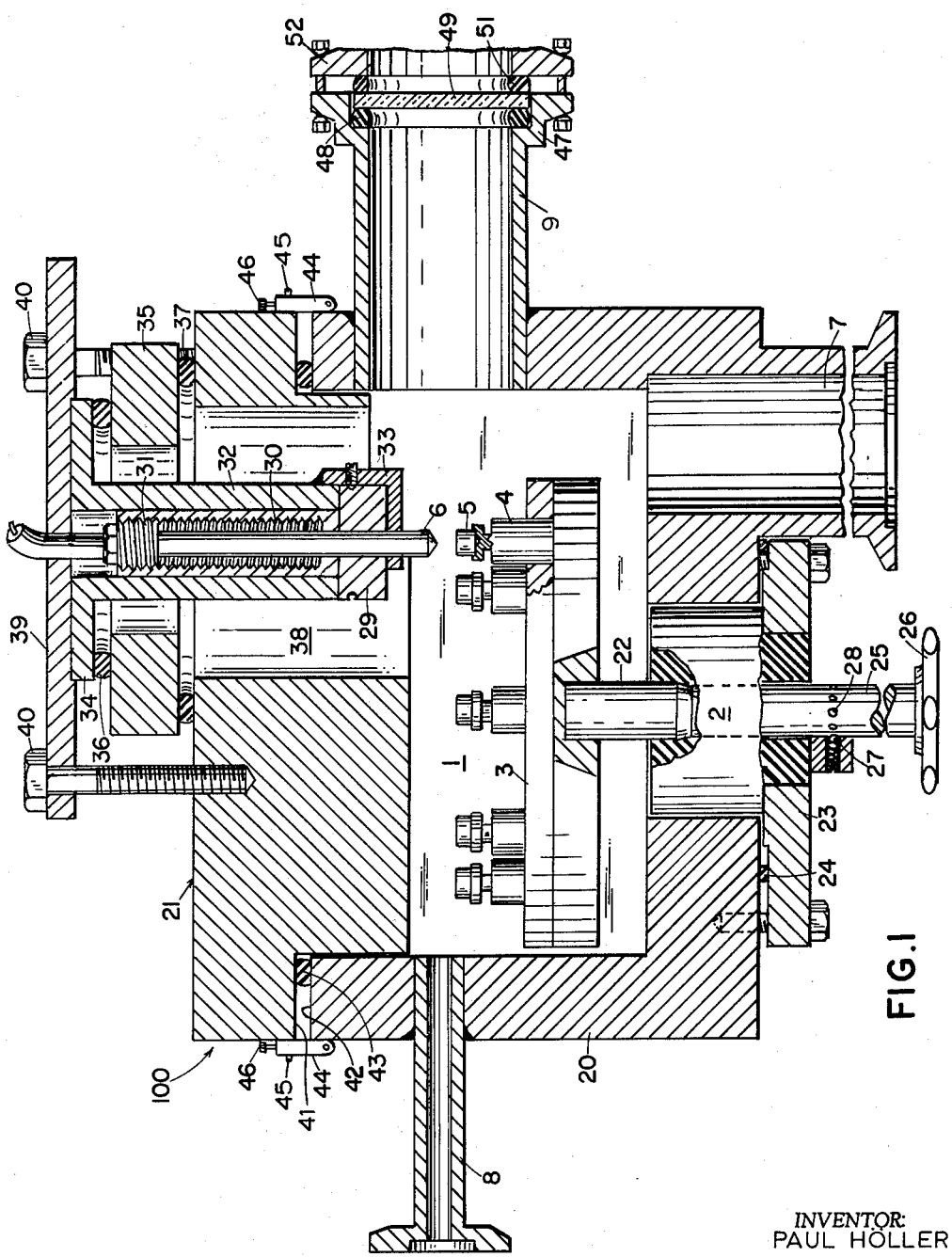
FIG. 1 is a vertical cross-sectional view of an activation chamber according to the invention.
Figure 2:
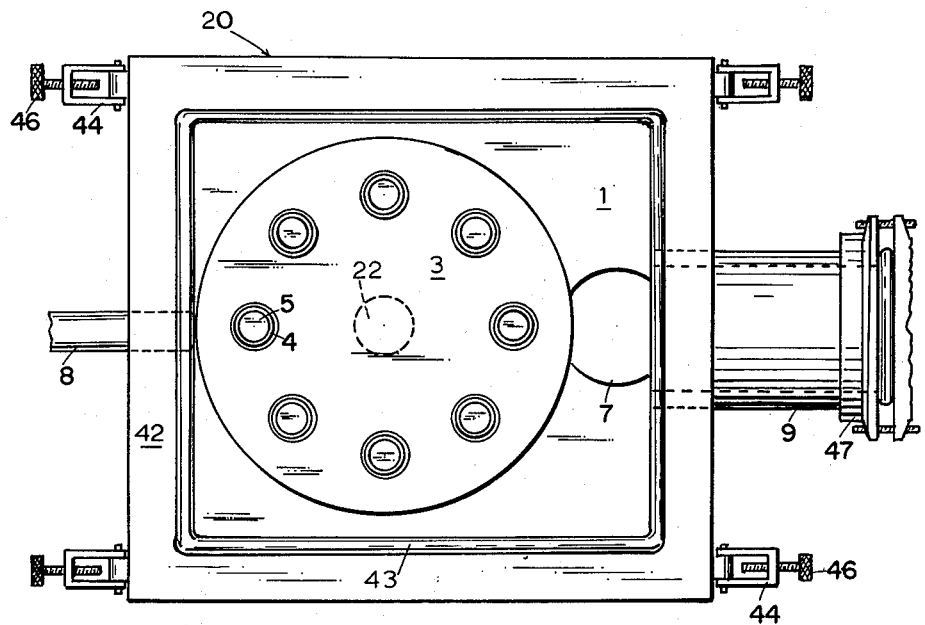
FIG. 2 is a plan view of the chamber with its cover removed.
Figure 3:
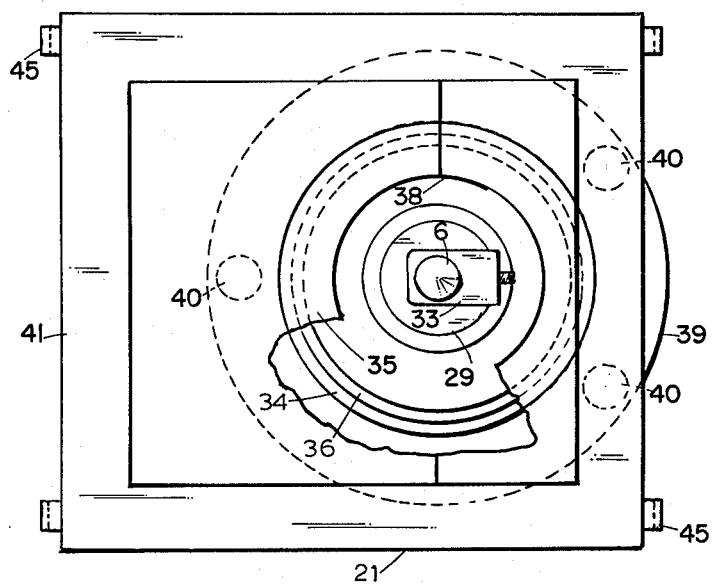
FIG. 3 is a bottom view of the cover showing the counterelectrode.

FIGS. 1-3 of the drawing show a gas-extraction unit 100 which comprises a casing 20, in the form of a generally cup-shaped body, and a cover 21 together enclosing the activation chamber 1. The body 20 carries a support plate 3 for a circular array of angularly spaced sample holders 4 (e.g. eight or twelve) which are composed of graphite and provided with recesses for receiving the metal samples 5. Support table 3 has its shaft 22 imbedded in a nonconductive bearing block 2 journaled in casing body 20 to which a sealing plate 23 is secured from below. Plate 23 urges an O-ring 24 against the casing to prevent the transfer of gas between the chamber 1 and the atmosphere in either direction. Block 2 is fixed to an extension 25 of shaft 22 provided with a handle 26 to facilitate rotation of the table 3 in such manner as successively to displace the sample holders 4 to an arc position directly below a stationary counter electrode 6.

Indexing means including a spring-loaded ball 27 and angularly spaced recesses 28 on extension 25 are provided for releasably retaining each holder 4 in an operative position wherein it is aligned with the stationary electrode 6. The latter is axially shiftable in a bushing 29 which is provided with an internally threaded shank 30. The electrode 6 carries a nut 31 threadedly received within shank 30. When bushing 29 is rotated within its sleeve 32 the electrode 6, which is held against rotation relative to the sleeve by a lug 33 thereof, is axially displaced to a position at the proper distance from the facing test electrode 4, 5. Sleeve 32 has a flange 34 which overlies an annular disk 35 and urges an O-ring 36 thereagainst. Disk 35 bears against a further O-ring 37 along the upper surface of cover 21 and extends over an opening 38 through which the sleeve 32 and electrode 6 pass. An insulating bar 39 is clamped via bolts 40 against flange 34 and serves to compress the O-rings 36 and 37 in order to seal opening 38 from the atmosphere.

Cover 21 is provided with a shoulder 41 which is juxtaposed with the rim 42 of casing 20. A sealing ring 43 is clamped between the shoulder and the rim by U-shaped clamping members 44 which are pivotally secured to the periphery of casing 20 and are swingable into engagement with lugs 45 on cover 21. A screw 46 on each clamping member 44 serves to lock the cover to the body. An inlet tube 8 is fixed to casing 20 and communicates with chamber 1 for admitting air thereto. The casing 20 is also formed with a conduit 7 to which may be coupled a vacuum pump, preferably of the diffusion type. A further tube 9 enters the casing at a location adjacent the arc position and serves for the introduction of the metal samples and for viewing the arc. A flange portion 47 of this tube is provided with a recess 48 adapted to receive a quartz window 49 which is secured between O-rings 50, 51.

Figure 4:
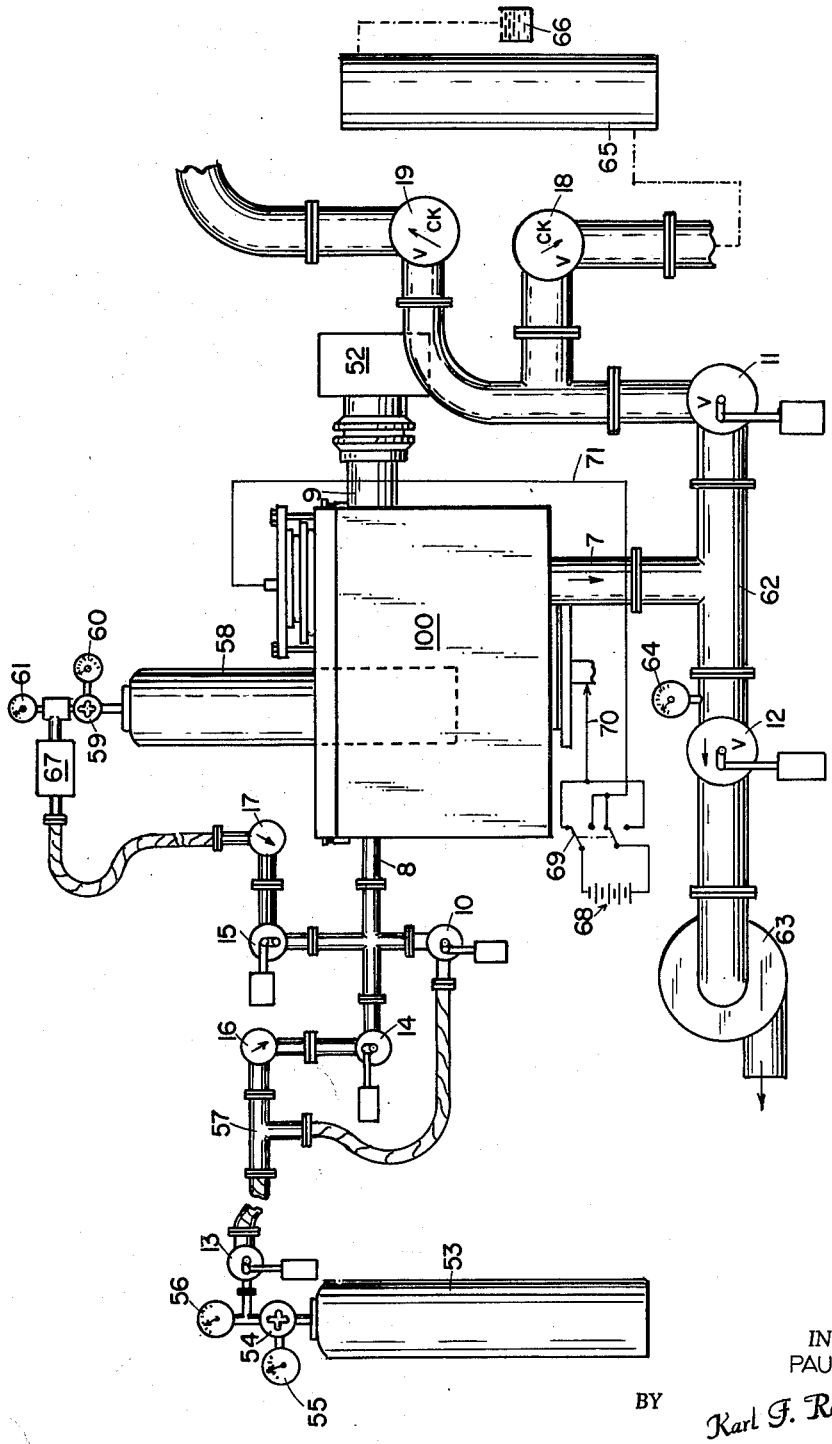
FIG. 4 is a somewhat diagrammatic view of a system for operating the chamber shown in FIGS. 1-3.

The reversal of the polarity of the electrodes 4 and 6 is accomplished with the aid of a reversing switch 69 and the direct-current source 68 (FIG. 4). Periodic operation of switch 69 results in the repeated reversal of the polarity of the voltage from battery 68 applied through the leads 70, 71 to the sample-support table 3 and the graphite electrode 6.

A spectrometer schematically shown at 52 is coupled with tube 9 at its flange 47. The interior of chamber 1 is blackened so as to prevent spurious reflected radiation from interfering with the analysis by a spectrometer.

As indicated in FIG. 4, the inlet tube 8 of the extraction unit 100 is connected via an electromagnetically operable valve 10 with a source of inert protective or carrier gas such as the cylinder 53 of argon. The latter is provided with the usual diaphragm-type expansion valve 54 and the high- and low-pressure gauges 55 and 56 indicating the pressure within the cylinder and the reduced output pressure, respectively. The argon is fed past a shut-off valve 13 to valve 10 via a T coupling 57. The other branch of this coupling is joined to inlet 8 via a check valve 16, whose function will be pointed out subsequently, and a control valve 14. Similarly, cylinder 58 of hydrogen has an expansion valve 59, a high-pressure gauge 60 and a low-pressure gauge 61. The low-pressure output from this source passes through a check valve 17 and a control valve 15 to inlet 8.

The suction pipe 7 of unit 100 is coupled via a T 62 and an electromagnetic valve 12 with a pump 63 which, although shown schematically as a mechanical pump, is preferably of the diffusion type (e.g. a mercury-vapor pump). A gauge 64 is provided to indicate the pressure within chamber 1. This gauge may, advantageously, be of the Pirani type. Another branch of the T 62 is connected to an electromagnetically operable valve 11 and check valves 18 and 19 to volumetric gas-analysis apparatus of known type. Such devices may include gas-absorption and chromatography columns, well known per se, or an oxidation column such as that shown at 65 in FIG. 4, filled with a catalyst (e.g. platinized asbestos) adapted to oxidize carbon monoxide to carbon dioxide. The carbon dioxide emanating from the column passes through the usual standardized base 66 which may then be titrated to provide an accurate indication of the carbon-monoxide concentration. The volume of extraction chamber 1 is so chosen as to render possible a complete quantitative analysis and extraction in a maximum of two minutes.

In operation, prior to the introduction of samples 5 into chamber 1, valves 10, 11, 14 and 15 are closed while valve 12 is opened and the diffusion pump 63 started to evacuate the chamber. A hydrogen-containing protective gas is then introduced into inlet 8 by opening valves 14 and 15 while valve 13 is opened to cut in cylinder 53. The apertures of valves 14 and 15 are adjustable and preset so that the argon from cylinder 53 and the hydrogen from cylinder 58 are admitted in suitable proportions, the mixture containing between 1 and 10% of hydrogen by volume. Advantageously, the hydrogen is passed over a catalytic purifier 67 wherein trace amounts of oxygen and water are removed. Check valves 16 and 17 prevent the backflow of hydrogen into the argon-control system and of argon into the hydrogen-control system, respectively, if a reverse-pressure differential is established at valves 14 or 15.

An electric arc intensified by the presence of hydrogen in the gas blanket is then struck between each of the graphite sample holders 4 and the graphite electrode 6 to degas them completely. Next, valves 14 and 15 may be cut off and the chamber 1 evacuated by pump 63. Valve 10 is then opened to admit only argon to the chamber. The arc may be maintained while the valves 10 and 12 are alternately operated to fill the chamber with argon and to evacuate it, thereby removing all traces of impurity gases.

Valve 12 is now closed or throttled while valve 10 regulates the flow of the argon carrier gas through the chamber. The metal samples 5 can then be disposed on their hollow holders 4 through tube 9 and the quartz window 49 positioned thereon preparatorily to attachment of the spectral analyser 52. An electric arc is thereupon struck between electrode 6 and the sample 5 positioned therebelow. While the spectral analyser 52 responds to the composition of the arc and provided an indication of the concentrations of the gases released from the sample, the argon sweeps these gases through the outlet conduits, open valve 11 and check valves 18, 19 into the analysing columns. It should be noted that although the carbon monoxide released from the sample is fully dissociated by the high-temperature electric arc, the oxygen in the cold outer shell or layer of this arc is quantitatively combined with carbon to form carbon monoxide as the gases leave the region of the arc. Instead of titrimetry, infra-red absorption or coulometric techniques may be employed for the determination of the carbon monoxide.

After analysis of the first sample, the chamber 1 may be cleaned by repeated introduction and evacuation of the argon, as previously described, and successive samples 5 disposed in the region of the arc in a similar manner.

The invention described and illustrated is believed to admit of many modifications within the ability of a person skilled in the art, such modifications being considered as coming within the spirit and scope of the appended claims.

I claim:

1. In a method of extracting gases from metals by the interposition of a metal sample between a pair of spaced electrodes in an extraction chamber to melt said sample, the improvement which comprises the steps of filling said chamber with a gas mixture consisting essentially of an inert gas admixed with between substantially 1 and 10% by volume of hydrogen prior to the disposition of said sample between said electrodes and forming an electric arc between said electrodes to degas them; and thereafter removing said gas mixture from said chamber and arc-smelting a metal sample between said electrodes.

2. A method according to claim 1 wherein said inert gas is argon.

3. A method according to claim 1 wherein direct current is passed through said electrodes to form said arc, further comprising the step of iteratively reversing the polarity of said electrodes during the passage of said electric arc therebetween.

4. A method according to claim 1 wherein said chamber is evacuated to remove the gas mixture therefrom subsequently to the degassing of said electrodes.

5. A method according to claim 4 wherein a substantially pure inert gas is admitted into said chamber subsequently to the evacuation thereof and said sample is then disposed between said electrodes.

6. A method according to claim 5 wherein said chamber is repeatedly evacuated and refilled with said substantially pure inert gas subsequently to the disposition of said sample between said electrodes.

References Cited by the Examiner
UNITED STATES PATENTS

| | | | |
|---|---|---|---|
| 2,224,044 | 12/40 | Francis et al. | 23—230 |
| 2,497,631 | 2/50 | Rothschild | 219—74 |
| 2,336,075 | 12/43 | Derge | 23—230 |
| 2,964,389 | 12/60 | Bennett et al. | 23—253 |
| 3,065,060 | 11/62 | Roehrig et al. | 23—253 |

MORRIS O. WOLK, *Primary Examiner.*
DELBERT E. GANTZ, *Examiner.*